United States Patent [19]
Dorr

[11] Patent Number: 5,442,595
[45] Date of Patent: Aug. 15, 1995

[54] CAPACITANCE-TYPE ULTRASONIC TRANSDUCER

[75] Inventor: John A. Dorr, Crofton, Md.

[73] Assignee: Xecutek Corporation, Annapolis, Md.

[21] Appl. No.: 231,550

[22] Filed: Apr. 22, 1994

[51] Int. Cl.⁶ .......................................... H04R 19/00
[52] U.S. Cl. ................................. 367/181; 381/174; 381/191
[58] Field of Search ................. 367/181; 381/174, 191

[56] References Cited

U.S. PATENT DOCUMENTS

| | | | |
|---|---|---|---|
| 3,373,251 | 3/1968 | Seeler | 367/181 |
| 3,787,642 | 1/1974 | Young, Jr. | 381/191 |
| 4,081,626 | 3/1978 | Muggli et al. | 367/181 |
| 4,142,073 | 2/1979 | Agneus et al. | 381/191 |
| 4,790,021 | 12/1988 | Pribyl | 381/191 |
| 5,121,627 | 6/1992 | D'Aoust | 73/19.05 |
| 5,315,877 | 5/1994 | Park et al. | 73/724 |

*Primary Examiner*—J. Woodrow Eldred
*Attorney, Agent, or Firm*—Jim Zegeer

[57] ABSTRACT

A capacitance-type ultrasonic transducer is disclosed in which a thin insulating plastic film or membrane is coated on one side with a thin film conductor, such as gold, and the back or counter electrode is comprised of a gas permeable conductor material such as sintered bronze. Springs are utilized to apply pressure to maintain good electrical contact between the gold film side of the membrane and an annular conductor. Signals are applied to and taken off of the gas permeable conductor backplate. Due to the porous structure of the back electrode and the gas permeability thereof, variations in ambient presure on the membrane or film are equalized. Ranges of operating freqeuncy can be established by size of particles used to form the sintered electrode.

8 Claims, 3 Drawing Sheets

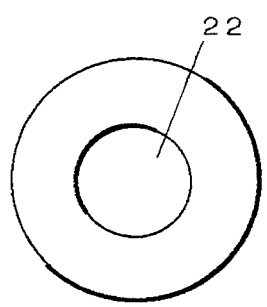 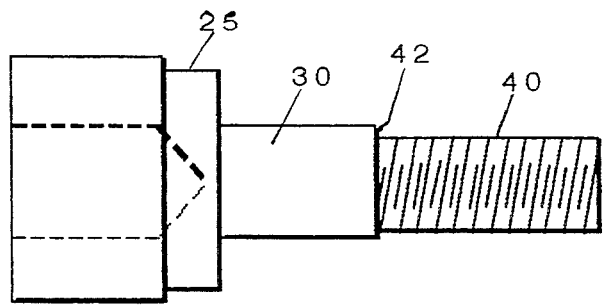
FIG. 4B        FIG. 4A
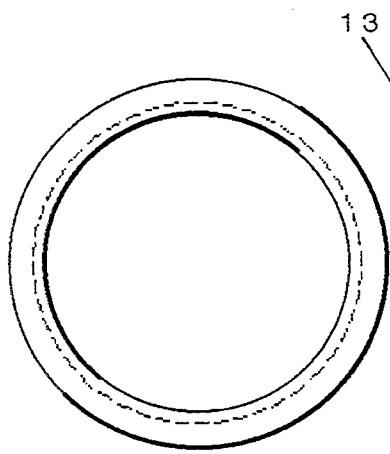 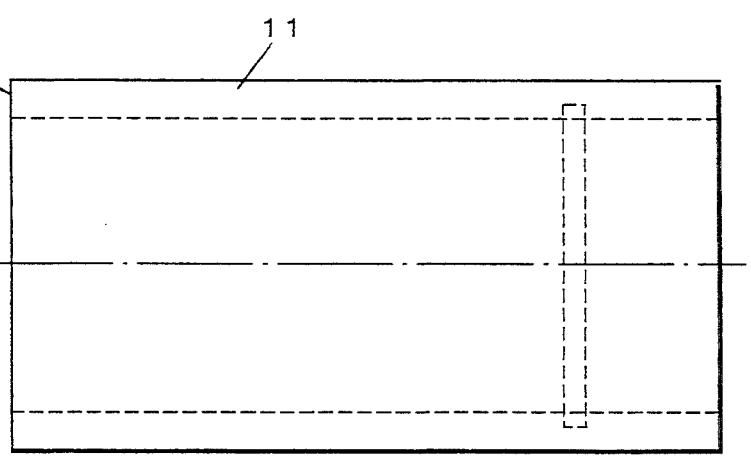
FIG. 5B        FIG. 5A

1

CAPACITANCE-TYPE ULTRASONIC TRANSDUCER

BACKGROUND OF THE INVENTION:

This invention relates to rugged, ultrasonic transducers and, more particularly, to ultrasonic transducers of the capacitance or SELL-type. Capacitance OR SELL-type electrostatic transducers are well known in the art. They typically comprise a transducer having a thin plastic insulating film metallized on one surface to form an electrode. The metallized film is stretched over a relatively massive metallic counter electrode, sometimes termed the backplate, with the non-metallized, non-conductive surface of the film in contact with the surface of the counter electrode or backplate. The metallized surface of the film separated by the insulating film from the backplate to form an ultrasonic transducer. Typically, such backplates are grooved. See Muggi et al. U. S. Pat. No. 4,081,826, Reynard U.S. Pat. No. 4,311,881, and Grebeler U.S. Pat. No. 4,887,248. The grooving or structural formations in the counter electrode or backplate is preferably eliminated in the present invention and backplate or counter electrode is made of a gas permeable sintered metal conductive disk member.

In a preferred embodiment, the edge of the gas permeable sintered metal conductive back electrode member is machined to provide an annular groove or shoulder in which is seated a smooth plastic ring for clamping the film while it is stretched across the surface of the sintered metal conductive disk member serving as a back electrode or backplate member.

Accordingly, the object of the invention is to provide a rugged, low cost ultrasonically efficient transducer. An ultrasonic transducer according to the invention comprises a hollow cylindrical housing, which may be conductive or nonconductive, and having an interior surface and means forming an annular shoulder. If the hollow cylindrical housing is nonconductive, then a conductive electrode is placed or formed on the annular shoulder and coupled through an electrical connector to serve as the ground electrode for the transducer. A high temperature plastic insulating film, such as Kapton, has first and second sides and a conductive metal film on the first side is engagable with the annular shoulder or the conductive means on the annular shoulder. A gas permeable sintered metal conductive disk member serving as a backplate or counter electrode has third and fourth sides, with the third side contacting the second side of the insulating film. Springs, in the form of a stack of Belville washers apply pressure on the fourth side of the gas permeable sintered metal disk to thereby clamp the high temperature plastic insulating film in stretched relation over the one surface of the sintered metal disk. A signalling or hot conductor is connected to the sintered metal conductive disk. The transducer is broadband with coarser screen mesh sizes of metal particles in the sintered metal having a lower frequency of operation; super fine mesh sizes at the highest frequency.

DESCRIPTION OF THE DRAWINGS:

The above and other objects, advantages and features of the invention will become more apparent when considered in conjunction with the following specification and accompanying drawings wherein:

FIGS. 4a and 4b are side and end views, respectively, of the sintered metal conductive back electrode and a brass mounting rod therefor, FIGS. 5a and 5b are side and end views, respectively, of the conductive coupling member for conductive coupling signals from the sintered bronze electrode to an electrical utilization circuit.

Figure 1:
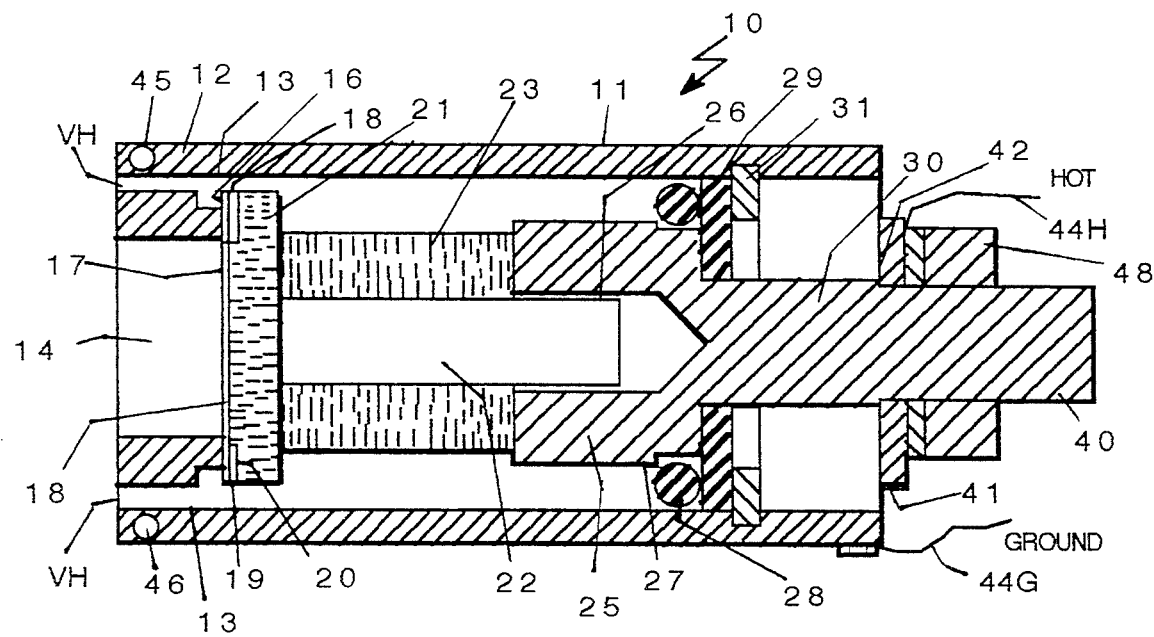
FIG. 1 is a sectional view through a ruggedized ultrasonic transducer incorporating a preferred embodiment of the invention.

DETAILED DESCRIPTION OF THE INVENTION:

Referring to the embodiment shown in FIG. 1 and its component parts which are illustrated in FIGS. 2a–5b, inclusive, a capacitance-type ultrasonic transducer 10 is provided with a cylindrical housing 11 which is made of a good conductive material such as brass. An end member 12 is soldered at 13 to the end of member 11 and is likewise a good conductor such as brass. End member 12 has vent holes VH and an annular shoulder 16 which makes electrical contact with the conductive gold metalized surface 17 on high temperature plastic film or membrane 18. High temperature plastic film 18 is typically about 0.0003 inches thick and preferably made of a material such as Kapton TM. A Teflon TM washer 19 is seated in an annular space 20 in the end of the back electrode 21. In this invention, back electrode 21 is made of a sintered bronze which is a gas permeable conductive material. A conductive centering rod is soldered or brazed to the rear surface of electrode 21. A stack of Belville spring washers 23 are telescoped over guide post 22 and exert a constant spring pressure on the non-plastic film side of the sintered porous electrode 21. Teflon TM washer 19 allows the strong pressure to sandwich the thin plastic film and its gold coated electrode 17 so that good electrical contact is made on the annular shoulder 16 without pressing through the sintering surface of electrode 21. In other words, the Teflon TM ring 19 protects the thin Kapton TM film from puncturing. The sinter of back electrode 21 is in intimate contact with the non-electrode side of the plastic film 18. The vent holes VH and the gas permeability of sintered electrode 21 allow pressure on both sides of the plastic film 18 to equalize. It has been found that it is not necessary to provide grooves in this surface but, it will be appreciated, the if desired, grooves may be provided. The key feature of electrode 21 is that it is a porous sintered conductive metal such as bronze.

The stack of Belville washers 23 is engaged by conductive member 25 which has a central bore 26 into which is telescoped the post 22. Member 25 has an annular notch 27 in which is seated a centering O-ring and seal 28, which is made of silicone rubber. O-ring 28 maintains a spacing between the conductive member 25 and the conductive cylinder housing 11. One or more nylon or mica-filled Teflon TM shoulder washers 29 are telescoped over the hot electrode output member portion 30 and further serve to maintain sintering of the electrode 30 in housing 11 while a metal retaining ring 31 is received in annular groove 32 to maintain the unit in assembly. Note that the conductor member post 30 may be pressed down to compress spring 23 while the retaining ring 31 is being installed so that upon release of the pressure on the Belville springs 23, the shoulder 35 bears against the nylon washers 29 and the retaining ring 31 so as to maintain a constant pressure on the non-plastic film side of the porous sintered conductive electrode 21.

In fabricating electrode 21, various mesh size particles may be used, depending on the desired or optimum frequency range:

|  | Mesh Screen Size of Panels | Mean Pore Opening |
| --- | --- | --- |
| Coarse | 30–60 | 90 microns |
| Medium | 60–100 | 40 microns |
| Fine | 100–150 | 25 microns |
| Extra Fine | 150–325 | 18 microns |
| Super Fine | 200–325 | 7 microns |

The transducer is broad-band with the coarser screen mesh size powders having lower frequency of operation and increasing in frequency to the super fine mesh sizes operating at the highest frequencies.

The conductor side 17 on thin insulated plastic film 18 makes permanent good electrical contact with annular shoulder 16 and end fitment 12 and, thence to the conductive cylindrical body 11 which then serves as the ground conductor. The threaded end 40 of member 30 has a conductive washer 41 seated on shoulder 42 and a conductive washer and lead connector 43 is securely fastened to make good electrical contact by a conductive nut 43 which is threadably engaged with threaded end 40.

It will be appreciated that an O-ring 45 is seated in an annular groove 46 in end member 12 to facilitate sealingly mounting the transducer in an opening of a utilization device, not shown. The signal conductors 44G and 44H may be connected to a coaxial cable, not shown, and connected to an operating circuit.

Figure 6:
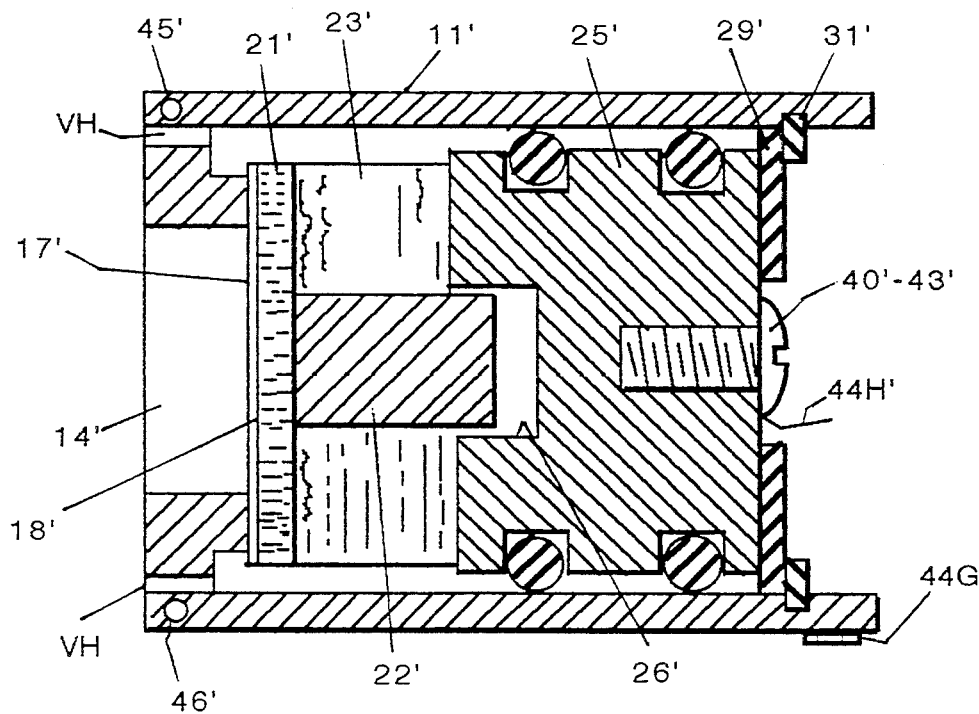
FIG. 6 is a sectional view through a further preferred embodiment of the invention.
Figure 2A:
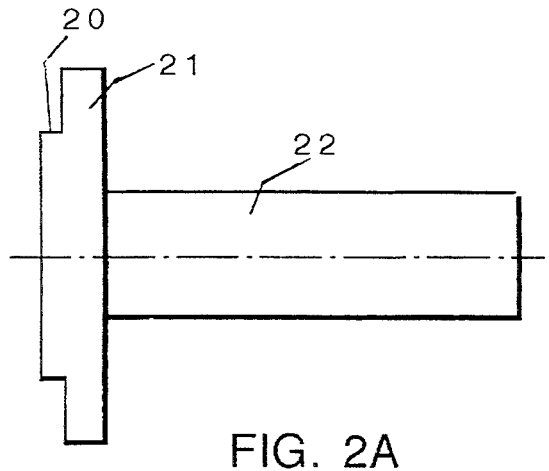
FIGS. 2a and 2b–2c are side and end views, respectively, of a cylindrical housing of the invention.
Figure 2C:
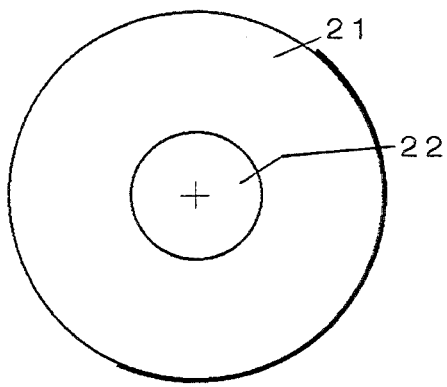
Figure 2B:
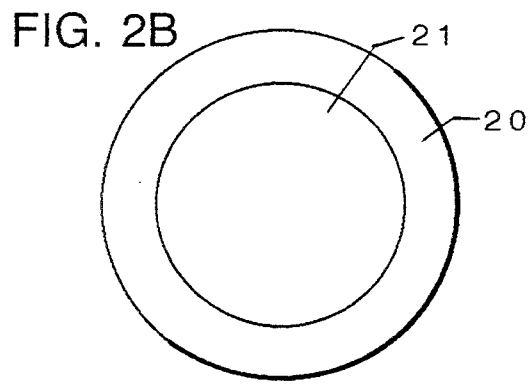
Figure 3A:
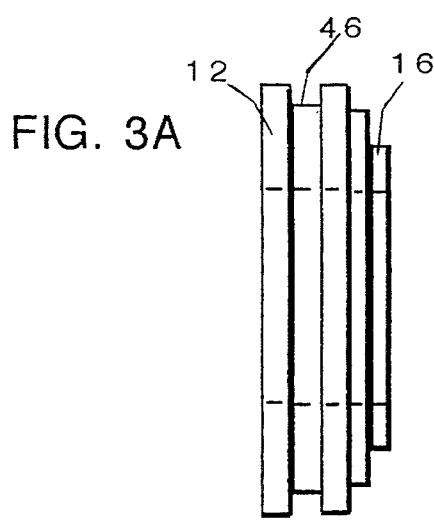
FIGS. 3a and 3b are side views and ends views, respectively, of the end seal member and ultrasonic aperture formed therein for exposing the metalized side of the plastic film to ambient.
Figure 3B:
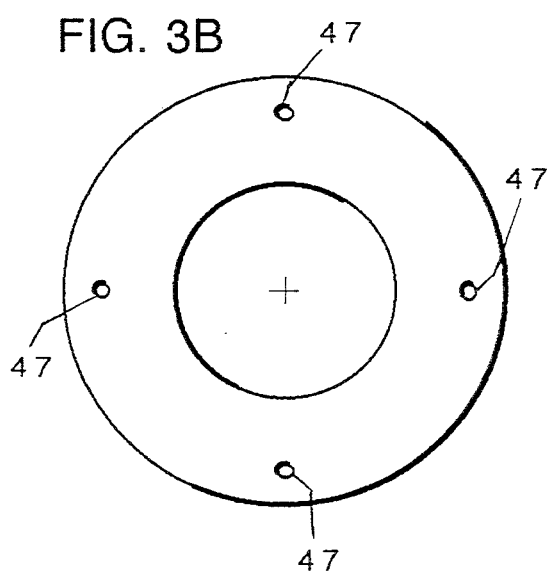

In the embodiment shown in FIG. 6, like or corresponding components have been given primed numerals. In this embodiment, the housing 11' and end member 12 are integrally formed and, a pair of O-rings serve to center and maintain the conductive center elements spaced from the outer connective walls. Vent holes VH and the gas permeability of the counter or back electrode 21, 21' assure that there is no unequal air pressure differentials acting on the membrane or plastic film 17.

In one preferred embodiment, the diameter of the active area of the counter or backplate electrode 21 (e.g., facing window 14 is about $\frac{1}{2}$" and the diameter of the backplate 21 is about .68 inches, having a nominal thickness of about 3/10"). The shoulder 20 is about 0.00031 inch thick. The Kapton TM membrane 18 was about 0.0003 inches thick, had a gold metalized film 17 on the surface engaging annular shoulder 16. In the embodiment shown in FIG. 1, the Belville spring washers apply uniform constant spring pressure on the rear surface of the porous sintered bronze counter or back electrode 21 so that a constant uniform pressure was between the shoulder 16 and the gold metalized surface 17.

It will be appreciated that instead of a brass conductive end fitment 12 and housing or sleeve 11, the housing an end fitment 12 may be made of high grade plastic with threaded fitments so that the solder joint 13 is replaced by a threaded coupling and an annular conducive member with a lead corresponding to lead 44G is seated between annular shoulder 16 (when made of plastic), replaces the annular shoulder made of conductive metal.

The resulting transducer is rugged and low in cost and very efficient.

While preferred embodiments of the invention have been shown and illustrated, it will be appreciated that various adaptations, modifications and changes may be made in the invention without departing from the true spirit and scope thereof.

What is claimed is:

1. An ultrasonic transducer comprising
   a hollow cylindrical housing having an open end, an interior and means forming an annular conductive contact surface in said interior,
   a high temperature plastic insulating film having first and second sides, a conductive metal film on said first side and engaged with said annular conductive contact surface,
   a gas permeable sintered metal conductive disk member having third and fourth sides a peripheral shoulder on said third side, a non-conductive member seated in said peripheral shoulder sandwiching said insulating film between said conductive contact surface and said peripheral shoulder, with said third side bounded by said peripheral shoulder contacting said second side of said insulating film,
   spring means for applying pressure on said fourth side of said gas permeable sintered metal conductive disk member,
   means forming a seal in said hollow cylindrical housing and retaining spring pressure on said film and said gas permeable sintered metal conductive disk member, and
   signalling conductor means connected to said conductive contact surface and said conductive disk.

2. The transducer defined in claim 1 wherein said spring means includes a plurality of Belville spring washers.

3. The transducer defined in one of claims 1 or 2 wherein said sintered conductive metal disk member is constructed of metal particles having a screen mesh size corresponding to a selected optimum frequency range with coarser screen mesh sizes having a lower frequency range than finer screen mesh sizes 4. An ultrasonic transducer comprising:
   a hollow cylindrical housing having a first and second open ends, an interior and means forming an annular conductive contact surface in said interior at one of said open ends,
   a high temperature plastic insulating film having first and second sides, a conductive metal film on said first side and engaged with said annular conductive contact surface,
   a gas permeable sintered metal conductive disk member having third and fourth sides with said third side contacting said second side of said insulating film, a centering rod secured to the center of said sintered metal conductive disk member,
   a conductive member having a central cavity receiving said centering rod and means spacing said conductive member in said housing,
   a plurality of spring washers between said fourth side and said conductive member for applying pressure on said fourth side of said gas permeable sintered metal conductive disk member, said conductive member forming a seal in said second open end of said hollow cylindrical housing and retaining spring pressure on said film and said gas permeable sintered metal conductive disk member, and signalling conductor means connected to said conductive member.

5. The transducer defined in claim 4 including O-ring seal means between said conductive member and the interior of said hollow cylindrical housing.

6. The transducer defined in claim 4 including vent means in the first open end of said hollow cylindrical housing permitting ambient air pressure to equalize gas pressure on both sides of said insulating film via said gas permeable metal conductive disk member.

7. The transducer defined in claim 4 wherein said sintered conductive metal disk member is constructed of metal particles having a screen mesh size corresponding to a selected optimum frequency range with coarser screen mesh sizes having a lower frequency range than finer screen mesh sizes.

8. An ultrasonic transducer comprising:

a housing having an open end, an interior and means forming an annular conductive contact surface in said interior, a high temperature plastic insulating film having first and second sides, a conductive metal film on said first side and engaged with said annular conductive contact surface, a gas permeable sintered metal conductive disk member having third and fourth sides with said third side contacting said second side of said insulating film, said sintered conductive metal disk member being constructed of metal particles having a screen mesh size corresponding to a selected optimum frequency range with coarser screen mesh sizes having a lower frequency range than finer screen mesh sizes, means for applying pressure on said fourth side of said gas permeable sintered metal conductive disk member, and signalling conductor means connected to said conductive contact surface and said conductive disk.

* * * * *